United States Patent Office 3,669,810
Patented June 13, 1972

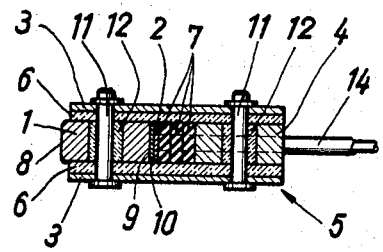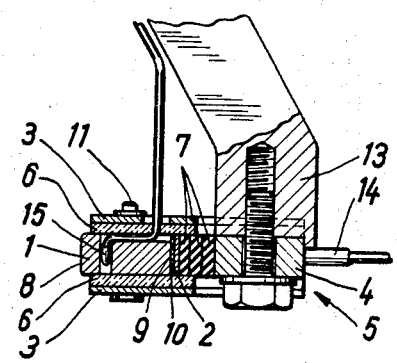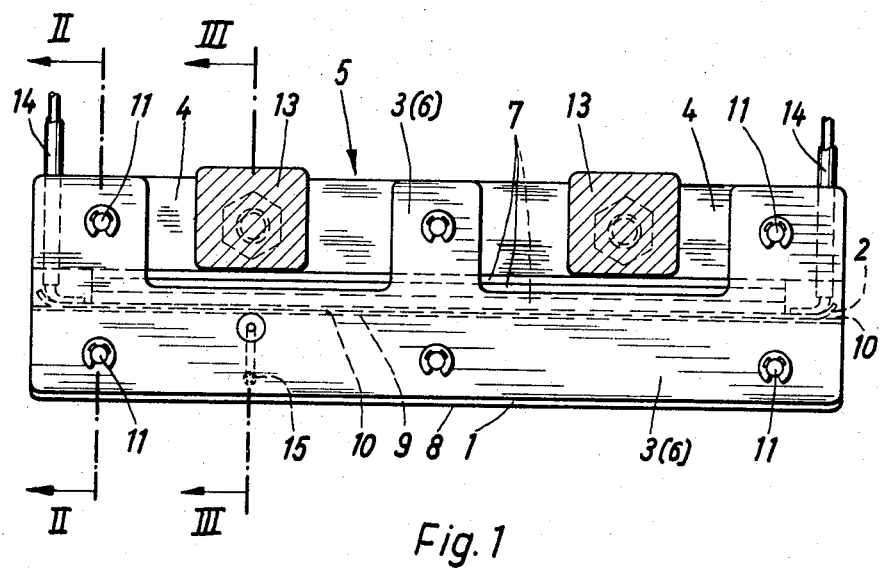

3,669,810
HEAT SEAL TOOL
Klaus Domke, Stuttgart-Weilimdorf, Germany, assignor to Fr. Hesser Maschinenfabrik AG, Stuttgart-Bad Cannstatt, Germany
Filed Mar. 13, 1970, Ser. No. 19,402
Claims priority, application Germany, Mar. 15, 1969, P 19 13 294.6
Int. Cl. B29c 19/02; B32b 31/20
U.S. Cl. 156—583                5 Claims

ABSTRACT OF THE DISCLOSURE

Heat seal tool for making seams on foils of thermoplastic material in which the heat conductor is formed as a band and arranged opposite to the work surface of the seal bracket with a thin insulating layer disposed therebetween; and elastic bias arranged against the band for uniform contact of the latter against the seal bracket.

---

The invention relates to a heat seal tool for producing seams on foil composed of thermoplastic material.

In the prior art a heat seal tool is already known, see Swiss Pat. 398,432, which operates at low voltage. The tool comprises a bracket, trapezoidal in cross section, with a heating conductor embedded therein; and an insulating layer surrounding the bracket except for the working area thereof, as well as a grip or holder extending around the layer. The particular advantage of such a heat seal tool resides in that the transfer of the heat from the heat seal bracket to the holder, or the machine parts, is largely avoided. However, less advantageous is that the heat transferred from the actual heat conductor to the seal bracket occurs with a delay and then is not completely uniform.

Also, in the case of a defective heating conductor it becomes necessary to practically replace the whole seal bracket.

In order to obviate the above mentioned shortcomings, it is proposed in accordance with the present invention, to provide a heat seal tool in which the heat conductor is formed as a narrow strip or band and is uniformly pressed against a longitudinal side of the seal bracket by elastic means which is under pressure. Said side is located opposite to the working area of the bracket and is covered with a thin layer of electrically insulating material.

Another aspect of the present invention resides in the provision of a heat seal tool in which the means which presses the heating band against the seal bracket is composed of one or more elastic brackets of silicon-rubber, or other similar materials having thermal or electrical insulating characteristics; the elastic brackets are secured against the holder which surrounds the seal bracket.

The arrangement of the present invention precludes mechanical damage to the heating conductors. Furthermore, an extremely good contact can be established between the band-like heating conductor and the sealing bracket which thus enables the best possible uniform heat transfer from the heat conductor to the seal bracket. Moreover, localized overheating of the heating band is effectively prevented.

In accordance with another aspect of the present invention the heat seal tool is provided with a holder having essentially only two parallel extending clamping plates and a mounting bracket secured therebetween. Arranged between the seal bracket and the clamping plates are provided insulating elements which prevent contact between the plates on the one hand and the seal bracket and the mounting bracket on the other.

It is therefore the primary object of the present invention to provide a more uniformly functioning heat seal tool which can be built in a simple and economic manner and requires relatively little space.

It is a further object of the present invention to provide a heat seal tool which is effective to block the heat to the drive or mounting members of the machine of which the tool forms a part.

For a better understanding of the present invention, together with other and further objects thereof, reference is had to the following description taken in connection with the accompanying drawings, and its scope will be pointed out in the appended claims.

In the drawing:

FIG. 1 is a top view of the heat seal tool in accordance with the present invention;

FIG. 2 is a sectional view taken along line II—II of FIG. 1; and

FIG. 3 is a sectional view taken along line III—III of FIG. 1.

Referring now to the drawing there is shown a heat seal tool comprising a longitudinally extending seal bracket 1, a heat conductor 2 formed as a band, two spaced clamping plates 3 and a mounting bracket 4 disposed between the plates 3 of a holder 5, as well as two plate-like insulating elements 6 and elastic pressure brackets 7.

The seal bracket 1 is preferably composed of aluminum and has a working surface 8 which, during heat sealing, bears against the foils which are to be connected.

The longitudinal face 9, of seal bracket 1, located opposite to the working surface 8 is coated with an electrically insulating layer 10. The insulating layer 10 may, for example, be composed of a thin strip of a heat retaining plastic material such as polyimide, polytetrafluorethylene, or the like. The layer 10 may also, in a known manner, be formed by an oxide layer on the surface of the bracket. The heating band 2 is pressed against the insulating layer 10 by means of an elastic pressure bracket 7. The pressure bracket 7, which preferably is composed of strips of silicon-rubber is supported by and abuts against holder 5. For operation at relatively high temperatures it is suitable to insert between the heating conductor and the elastic pressure bracket 7 a high heat retaining insulating material, in the form of a layer, of, for instance, asbestos, ceramic or polytetrafluorethylene.

On both inwardly facing sides of the seal bracket 1 there are arranged strip-like insulating elements 6 which, for example, may also be composed of silicon-rubber, polytetrafluorethylene or asbestos. The arrangement of the insulating elements is such that there is no metallic contact between the clamping plates and the mounting bracket. When silicon-rubber or polytetrafluorethylene is used, it is also possible to draw the insulating strip simultaneously over the working surface of the seal bracket. The seal bracket 1 and the clamping plates 3, as well as the insulating elements 6 and the mounting bracket 4 are held together by means of bolt 11 which protrudes through the aforementioned elements. In order to avoid any undesirable heat dissipation or heat transfer through bolt 11 a bushing 12 of heat insulating material surrounds part of the stem of the bolt 11.

The mounting bracket 4 serves for securing the seal tool to a machine member 13 of a packaging machine which is not illustrated.

As a complementary tool for the seal bracket described above, a second seal tool may be utilized which can be constructed in the same manner, or an unheated press jaw can be used.

The current flows continuously to heat conductor 2 at low voltage through connecting cables 14 and the same is controlled in a conventional manner by a switch arrangement which is not shown. This is distinguished from an impulse device in which short pulses are transmitted to the conductor. The above described novel seal tool facilitates, as a result of its unique construction, the adaptation of a thermal element 15 or some other heat sensor on bracket 1 so that the temperature on the seal bracket can be exactly controlled.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. Heat seal tool of the continuous current type for producing seams on a foil of thermo-plastic material comprising:
   a heat conductor responsive to low voltage and formed as an elongated band;
   a bar-like heat seal bracket having an effective working surface arranged co-extensive to said band, and a longitudinally extending surface located opposite to that of the working surface and facing said band with a layer of electrically insulating material being interposed therebetween;
   a thermo insulated holder covering the side walls of said seal bracket located perpendicular to the working surface;
   an elongated mounting bracket arranged substantially co-extensive with and in spaced relation to said seal bracket;
   strip-like elastic means disposed under a uniform preload between said seal bracket and said mounting bracket abutting said heat conductor substantially along the total length for uniformly biasing said band against said heat seal bracket.

2. Heat seal tool according to claim 1, wherein said elastic means is laterally confined against movement by said holder and is composed of silicon-rubber.

3. Heat seal tool according to claim 1, wherein said holder is comprised of two spaced, parallel extending, clamping plates, and said mounting bracket is disposed therebetween.

4. Heat seal tool according to claim 3, and heat insulated screws extending laterally across said clamping plates and through at least one of said brackets.

5. Heat seal tool according to claim 1, and a layer of high heat resistant material between said band and said elastic means.

References Cited

UNITED STATES PATENTS

| | | | |
|---|---|---|---|
| 2,574,094 | 11/1951 | Fener et al. | 156—583 |
| 2,822,029 | 2/1958 | Hoagland | 156—380 |
| 3,531,621 | 9/1970 | Beck | 156—583 |

BENJAMIN A. BORCHELT, Primary Examiner

J. J. DEVITT, Assistant Examiner

U.S. Cl. X.R.

100—93 P; 156—380